July 22, 1958 — R. E. SPENCE — 2,844,013
UNIVERSAL JOINT
Filed Sept. 4, 1957
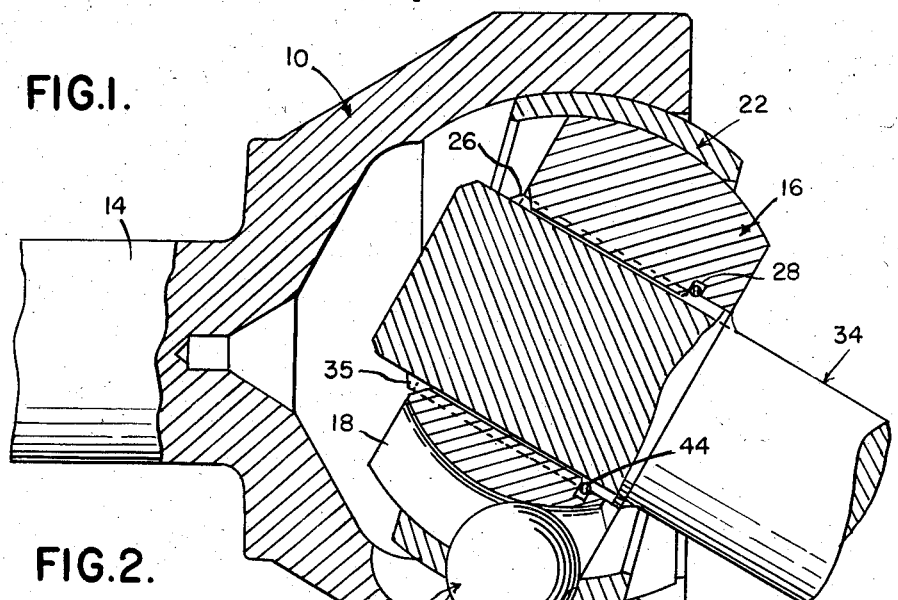
FIG.1.
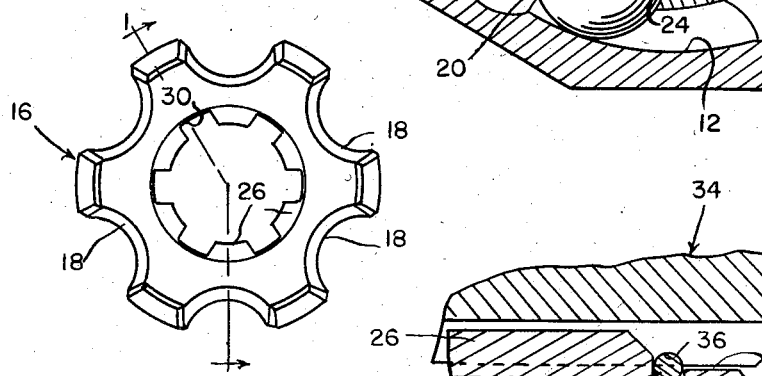
FIG.2.
FIG.3.
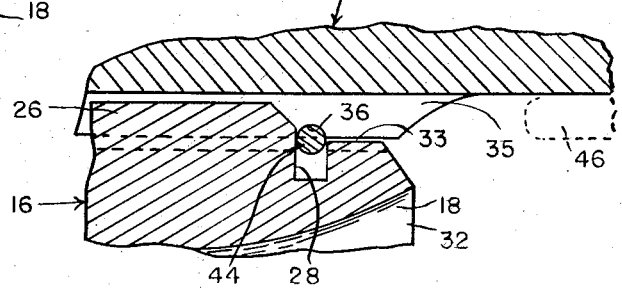
FIG.4.
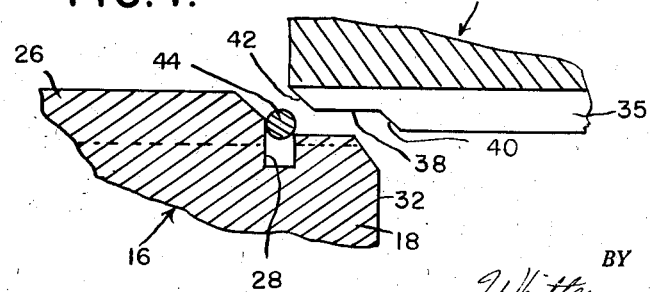
*INVENTOR.*
ROBERT E. SPENCE
BY
Whittemore, Hulbert & Belknap
ATTORNEYS

2,844,013
Patented July 22, 1958

2,844,013

UNIVERSAL JOINT

Robert E. Spence, St. Clair Shores, Mich., assignor to The Gear Grinding Machine Company, Detroit, Mich., a corporation of Delaware Application September 4, 1957, Serial No. 681,998

8 Claims. (Cl. 64—21)

This invention relates generally to a connection between members and refers more particularly to a constant velocity universal joint having a releasable connection between an internally splined annular ball race member and an externally splined shaft received in the with the outer race member.

One object of the invention is to provide a releasable connection between members which permits of quick and easy assembly and disassembly.

Another object of the invention is to provide a quick and easy connection between the internally splined inner race member of a constant velocity universal joint and an externally splined shaft received in the inner race member.

Other objects and features of the invention will become apparent as the description proceeds, especially when taken in conjunction with the accompanying drawing, illustrating a preferred embodiment of the invention, wherein:

Fig. 1 is an elevational view, partly in section, of a constant velocity universal joint embodying the invention; the sectional portion taken substantially along the line 1—1 on Fig. 2;

Fig. 2 is an end elevation of the inner race member;

Fig. 3 is an enlarged fragmentary view of a portion of Fig. 1;

Fig. 4 is similar to Fig. 3 but shows the parts in another position.

Referring now more particularly to the drawing, the universal joint comprises a generally bell-shaped outer race member 10 formed with circumferentially spaced ball grooves 12 on its inner surface, only one of which can be seen in Fig. 1. A shaft 14 is formed integrally with the outer face member.

The universal joint also includes an annular inner race member 16 normally disposed within the outer race member and having the circumferentially spaced ball grooves 18 on its outer periphery which correspond to and approximately register with the grooves 12 in the outer race member. The number of grooves 18 is equal to the number of grooves 12, and a ball 20 is provided in each pair of registering grooves. An annular ring-like cage 22 is disposed within the outer race member and encircles the inner race member, having apertures 24 therein for receiving the balls.

Constant velocity is achieved by the ball groove geometry which maintains the driving balls and cage in a half angle position at all times. The groove construction compels the balls with the cage always to lie in a plane which bisects the angle between the driving and driven shaft no matter what the shaft angle may be. By maintaining the balls in the correct bisecting plane at all times, true constant velocity motion results.

The inner race member is formed with the internal splines 26 which extend from one end of the member to the other. The inner race member is formed with a circumferentially extending internal angular groove 28 which lies in a plane perpendicular to the axis of the inner race member, and the bottom of the groove has a greater radius than the radius of the recesses or grooves 30 between the splines. The tops of the splines 26 are each substantially relieved from the groove 28 to the end 32 of the inner race member, as seen at 33 in Figs. 3 and 4.

The shaft 34 is received within the inner race member and is formed with external splines 35 adapted to extend into the recesses 30 separating the splines 26 of the inner race member to provide a non-rotatable connection therebetween. The splined portion of the shaft is formed with a circumferentially extending groove 36 which lies in a plane at right angles to the axis of the shaft. The depth of the groove is less than the radial height of the splines 35 so that the groove is really intermittent and formed by the segments in each spline which lie in continuation of one another. The radial height of the splines 35 is reduced at one end to provide a pilot diameter portion 38. The splines of the pilot diameter portion are connected into the main body portion thereof by the 30° taper 40. The splines of the pilot diameter portion 38 are also tapered at the front end 42.

A transversely split resilient snap ring 44 is provided to form a connection between the inner race member and the shaft.

In order to assemble the inner race member and shaft, the snap ring is inserted into the groove 28 of the inner race member as shown in Fig. 4. The snap ring is shown in Fig. 4 in its natural unstressed condition and extends only partly into the groove. The pilot diameter portion of the shaft is then inserted inside the snap ring, expanding it slightly. The shaft splines are then aligned with the inner race member splines and the shaft is pushed into the inner race member causing the snap ring to be further expanded by the 30° taper indicated at 40. The snap ring will ride over the major diameter portion of the shaft splines as the shaft is further inserted until the snap ring snaps into and seats in the snap ring groove 36 in the shaft. In this position, shown in Fig. 3, the snap ring projects partly into the groove 28 of the inner race member to retain the shaft securely within the inner race member against axial movement.

To disassemble, three or more disassembly pins 46, shown in dotted lines in Fig. 3, are inserted along the shaft between the splines thereof. The pins are each formed with a rounded end and are of a diameter substantially equal to the radial height of the shaft splines. The pins are adapted to extend within the snap ring and to expand it clear of or almost clear of the major diameter of the shaft splines. The groove 28 in the inner race member is of sufficient depth to receive the snap ring when it is thus expanded. The shaft may now be pulled from the inner race member.

What I claim as my invention is:

1. In a universal joint of the type including inner and outer ball races and adapted to transmit rotary motion between shafts, an annular inner race member having an internally splined portion, a shaft member received in said inner race member and having an externally splined portion engaging the splined portion of said inner race member to provide a non-rotatable connection between said members, a circumferentially extending groove in the splined portion of one of said members and a circumferentially extending groove in the other of said members registering with said first-mentioned groove, a flexible snap ring seated in one of said grooves and projecting partly into the other of said grooves to prevent relative axial movement between said members, said snap ring being adapted to be flexed from said one groove farther into said other groove and said other groove being of sufficient depth to accommodate said snap ring when thus flexed, and means providing an access opening in at least one of said members to said snap ring for the insertion of a tool to flex said snap ring as aforesaid.

2. In a universal joint of the type including inner and outer ball races and adapted to transmit rotary motion between shafts, an inner race member having a recess, a shaft member received in the recess of said inner race member, a circumferentially extending external groove in said shaft member and a circumferentially extending internal groove in said recess registering with said external groove, a flexible snap ring in one of said grooves and projecting partly into the other of said grooves to prevent relative axial movement between said members, said snap ring being adapted to be flexed from said one groove farther into said other groove and said other groove being of sufficient depth to accommodate said snap ring when thus flexed, and means providing an access opening in at least one of said members to said snap ring for the insertion of a tool to flex said snap ring as aforesaid.

3. In a universal joint of the type including inner and outer ball races and adapted to transmit rotary motion between shafts, an annular inner race member having an internally splined portion, a shaft member received in said inner race member and having an externally splined portion engaging the splined portion of said inner race member to provide a non-rotatable connection between said members, a circumferentially extending external groove in the splined portion of said shaft member and a circumferentially extending internal groove in the splined portion of said inner race member registering with said external groove, a flexible snap ring seated in one of said grooves and projecting partly into the other of said grooves to prevent relative axial movement between said members, said snap ring being adapted to be flexed from said one groove farther into said other groove and said other groove being of sufficient depth to accommodate said snap ring when thus flexed, at least one of the splines of the splined portion of said inner race member being relieved from said other groove to one end of the splined portion of said inner race member to provide access to said snap ring for the insertion of a tool to flex said snap ring as aforesaid.

4. In a universal joint of the type including inner and outer ball races and adapted to transmit rotary motion between shafts, an annular inner race member having an internally splined portion, a shaft member received in said inner race member and having an externally splined portion engaging the splined portion of said inner race member to provide a non-rotatable connection between said members, a circumferentially extending external groove in the splined portion of said shaft member and a circumferentially extending internal groove in said inner race member registering with said external groove, a flexible snap ring seated in said external groove and projecting partly into said internal groove to prevent relative axial movement between said members, said snap ring being adapted to be flexed from said external groove farther into said internal groove and said internal groove being of sufficient depth to accommodate said snap ring when thus flexed, and means providing an access opening in one of said members to said snap ring for the insertion of a tool to flex said snap ring as aforesaid.

5. In a universal joint of the type including inner and outer ball races and adapted to transmit rotary motion between shafts, an annular inner race member having an internally splined portion, a shaft member received in said inner race member and having an externally splined portion engaging the splined portion of said inner race member to provide a non-rotatable connection between said members, a circumferentially extending external groove in the splined portion of said shaft member and a circumferentially extending internal groove in the splined portion of said inner race member registering with said external groove, a flexible snap ring seated in said external groove and projecting partly into said internal groove to prevent relative axial movement between said members, said snap ring being adapted to be flexed from said external groove farther into said internal groove and said internal groove being of sufficient depth to accommodate said snap ring when thus flexed, certain of the splines of the splined portion of said inner race member being relieved from said internal groove to one end of the splined portion of said inner race member to provide access to said snap ring for the insertion of a tool to flex said snap ring as aforesaid.

6. In structure of the class described, a member having a recess, a shaft member received in said recess, a circumferentially extending external groove in said shaft member and a circumferentially extending internal groove in said recess registering with said external groove, a flexible snap ring in one of said grooves and projecting partly into the other of said grooves to prevent relative axial movement between said members, said snap ring being adapted to be flexed from said one groove farther into said other groove and said other groove being of sufficient depth to accommodate said snap ring when thus flexed, and means providing an access opening in at least one of said members to said snap ring for the insertion of a tool to flex said snap ring as aforesaid.

7. In structure of the class described, an annular member having an internally splined portion, a shaft member received in said annular member and having an externally splined portion engaging the splined portion of said annular member to provide a non-rotatable connection between said members, a circumferentially extending groove in the splined portion of one of said members and a circumferentially extending groove in the other of said members registering with said first-mentioned groove, a flexible snap ring seated in one of said grooves and projecting partly into the other of said grooves to prevent relative movement between said members, said snap ring being adapted to be flexed from said one groove farther into said other groove and said other groove being of sufficient depth to accommodate said snap ring when thus flexed, and means providing an access opening in at least one of said members to said snap ring for the insertion of a tool to flex said snap ring as aforesaid.

8. In structure of the class described, an annular member having an internally splined portion, a shaft member received in said annular member and having an externally splined portion engaging the splined portion of said annular member to provide a non-rotatable connection between said members, a circumferentially extending external groove in said shaft member and a circumferentially extending internal groove in said annular member registering with said external groove, a flexible snap ring seated in said external groove and projecting partly into said internal groove to prevent relative axial movement between said members, said snap ring being adapted to be flexed from said external groove farther into said internal groove and said internal groove being of sufficient depth to accommodate said snap ring when thus flexed, certain of the splines of the splined portion of said annular member being relieved from said internal groove to one end of the splined portion of said annular member to provide access to said snap ring for the insertion of a tool to flex said ring as aforesaid.

References Cited in the file of this patent

UNITED STATES PATENTS

| | | |
|---|---|---|
| 738,503 | Waters | Sept. 8, 1903 |
| 2,182,455 | Smith | Dec. 5, 1939 |
| 2,427,237 | Suczek | Sept. 9, 1947 |
| 2,717,071 | Cook | Sept. 6, 1955 |